United States Patent [19]

Marto

[11] Patent Number: 4,580,669
[45] Date of Patent: Apr. 8, 1986

[54] MOWER DRIVE MECHANISM

[75] Inventor: John H. Marto, Oshkosh, Wis.

[73] Assignee: Ingersoll Equipment Co., Inc., Winnecone, Wis.

[21] Appl. No.: 540,986

[22] Filed: Oct. 11, 1983

[51] Int. Cl.$^4$ .................... F16H 15/08; A01D 69/08; B60K 41/22

[52] U.S. Cl. ................ 192/3.54; 192/17 R; 74/194; 74/196; 74/197; 56/11.3; 56/DIG. 4

[58] Field of Search .................. 192/3.54, 3.63, 17 R; 74/105, 106, 194, 196, 197; 56/11.3, DIG. 4

[56] References Cited

U.S. PATENT DOCUMENTS

| | | | |
|---|---|---|---|
| 3,580,351 | 5/1971 | Mollen | 74/194 X |
| 3,667,304 | 6/1972 | Puffer et al. | 74/196 X |
| 3,678,770 | 7/1972 | Enters et al. | 74/197 |
| 4,169,392 | 10/1979 | McDonald | 74/194 |
| 4,173,153 | 11/1979 | Klug et al. | 74/197 |
| 4,502,344 | 3/1985 | Klug | 74/197 X |

Primary Examiner—Rodney H. Bonck
Assistant Examiner—Richard M. Lorence
Attorney, Agent, or Firm—Cullen, Sloman, Cantor, Grauer, Scott & Rutherford

[57] ABSTRACT

A mower drive mechanism including a clutch-brake assembly, a travel control and neutral lift-off assembly, and a traction sensor assembly for a friction disc transmission having a driven disc engageable with a drive disc. The clutch-brake assembly includes a rockshaft, bellcrank actuator asssembly, and swing plate for raising the driven disc of the friction disc transmission when the rockshaft rotates a predetermined amount. Further rotation of the rockshaft causes a brake arm to come into engagement with a brake hub on the drive shaft for the driven disc thereby effecting a braking action. Also, a spring force is applied to the rockshaft which is transmitted through the bellcrank actuator assembly to the swing plate for biasing the driven disc toward the drive disc in a driving mode. The travel control and neutral lift-off assembly includes a rotatable control member for causing the driven disc to be moved linearly along its drive shaft to a desired speed and direction of rotation setting. The rotatable control member is also connected to a neutral cam member, and when the driven disc is positioned at a neutral speed or directional setting, the neutral cam member raises the swing plate thereby raising the driven disc above the drive disc. Finally, the traction sensor assembly includes an idler sprocket which senses increases in the tension in the final drive chain due to increased load. As the chain tension increases, additional traction force is applied between the driven disc and drive disc by a linkage connected between the idler sprocket and bellcrank actuator assembly.

5 Claims, 6 Drawing Figures

4,580,669

MOWER DRIVE MECHANISM

BACKGROUND OF THE INVENTION

The present invention relates to a variable speed mower drive mechanism comprising a friction disc transmission having a pair of discs with a friction or driven disc engaging the face of a drive disc. Friction disc transmissions of the type disclosed herein are used primarily for propulsion of small land traversing machines, particularly power lawn mowers.

A variable speed friction disc transmission of the type disclosed herein is shown in U.S. Pat. Nos. 4,169,392 and 4,173,153, assigned to the assignee of the present invention. The transmission disclosed in the aforementioned patents includes a driving disc rotatable about a vertical axis having a flat horizontal face normal to its axis of rotation and a driven disc rotatable on an axis normal to the axis of the driving disc and having its periphery engaging the face of the driving disc. The driving disc is rotatably supported on a swing arm which is swingable about a vertical axis.

The speed at which rotation is imparted to the driven disc is a function of the distance between the axis of the driving disc and the zone at which its face is engaged by the periphery of the driven disc. Further, the driven disc rotates in one direction on one side of the rotational axis of the driving disc and in the opposite direction on the opposed side.

The friction disc transmission disclosed in U.S. Pat. Nos. 4,169,392 and 4,173,153 has a self-energizing feature that causes the contact pressure between the driven and driving discs to be proportional to the torsional load on the wheel axle. However, the initial engagement between the driven and driving discs produces slippage which is a source of wear on the friction discs. Thus, there has been a need for a mower drive mechanism which provides a smooth start when the friction discs are initially engaged while being self-energizing to overcome slippage under load. Further, there has been a need for a friction disc transmission which minimizes the lateral resisting forces between the discs to allow the transmission to change ground speed or direction with ease and to provide, when required, additional traction force to the transmission to prevent slippage and to eliminate traction surging in all operating modes.

SUMMARY OF THE INVENTION

The mower drive mechanism of the present invention has several interrelated operating assemblies including a clutch-brake assembly, a travel control and neutral lift-off assembly, and a traction sensor assembly. These operating assemblies provide a smooth start for a friction disc transmission when the friction discs are initially engaged and provide additional traction force to the transmission to prevent slippage and to eliminate traction surging in all operating modes.

The friction disc transmission includes a drive disc rotatably mounted on a generally vertical axis and a driven friction disc rotatable about an axis normal to the axis of the drive disc and having a periphery engaging the face of the drive disc. The driven disc is mounted on a drive shaft which is supported for rotation between a pivot frame and a swing plate. The driven assembly, including the driven disc, pivot frame and swing plate, is pivotally movable downwardly to permit engagement between the driven disc and drive disc. The speed and direction of rotation of the driven disc is controlled by operating an operator's handle which is connected to an L-shaped control member by suitable linkage for rotating the control member thereby causing the driven disc to move linearly along its drive shaft to a desired speed and direction of rotation setting.

The clutch and brake assembly for the mower drive mechanism includes as one of its principal components the swing plate that supports one end of the drive shaft for the driven disc. The swing plate is lifted and lowered by means of a bellcrank actuator assembly which includes an enlarged actuator pin formed on a bellcrank member with the actuator pin being movable within an enlarged slot in the swing plate. The actuator assembly further includes a drag link which is connected by means of a lever to a clutch-brake rockshaft. A lift pawl is pivotally attached to the drag link, and it includes an open slotted end which embraces the actuator pin for rotating the bellcrank member and lifting the actuator pin within the swing plate slot in response to rotation of the clutch-brake rockshaft.

Thus, when the clutch-brake rockshaft rotates, the drag link shifts and the lift pawl, in turn, rotates the bellcrank member and actuator pin upwardly within the swing plate slot which ultimately results in upward movement of the swing plate for raising the driven disc away from the drive disc thereby declutching the friction disc transmission.

The clutch-brake rockshaft is rotated in response to movement being imparted to it from a conventional foot pedal which is depressed when either a clutching or braking action is desired. Further, a brake arm is operatively connected to the rockshaft so that when the rockshaft is rotated a predetermined amount, the brake arm is brought into engagement with a brake hub on the drive shaft for the driven disc thereby effecting a braking action. Thus, as the clutch-brake rockshaft rotates, a declutching action occurs first where the driven disc is raised away from the drive disc and then the braking action occurs upon further rotation of the rockshaft.

The clutch-brake rockshaft is normally biased toward a driving mode until a declutching or braking operation is effected by rotating the rockshaft as previously described. The clutch-brake rockshaft is spring biased for applying a downward normal force on the swing plate in a driving mode thereby biasing the driven disc toward the drive disc. That is, the spring bias applied to the rockshaft is transmitted through the drag link and bellcrank member to the actuator pin for applying a downward force to overcome slippage between the discs under load.

The present construction also provides a neutral lift-off mode where the driven disc is separated from the drive disc by using the same linkage that controls the speed and direction of rotation for the driven disc. The L-shaped control member, which is operably connected to an operator's handle as previously described, is also connected to a neutral cam member by means of a neutral cam drag link. As the control member rotates and moves the driven disc to the central vertical axis of the drive disc, it trails the neutral cam drag link which, in turn, rotates the neutral cam member. A cam surface on the cam member comes into engagement with a roller on the swing plate for raising the swing plate vertically when the driven disc reaches a neutral speed or directional setting. This occurs without the need for declutching through the clutch-brake rockshaft and bellcrank actuator assembly.

The mower drive mechanism also includes another assembly for providing additional traction force when the driven and drive discs are under load. An idler sprocket is rotatably mounted to a rockshaft for engagement with the drive chain connecting the rear wheel axle sprocket. A lever is also rotatably connected to the rockshaft with one of its ends biased by a spring into engagement with an adjustable stop. The idler sprocket is biased against the drive chain by the coaction between the spring, lever and rockshaft. The lever is also connected to the bellcrank member by means of a spring assembly which includes a compression spring that is adjusted so that normally, no force is applied by this spring to the linkage.

In operation, the tension in the final drive chain increases as the load on the mower drive mechanism increases. When the final drive chain tension force exceeds the preload force on the idler sprocket, the idler sprocket is rotated which, in turn, rotates the lever and puts the spring assembly in tension. This causes the bellcrank member to rotate resulting in a downward application of force from the bellcrank member actuator pin against the swing plate thereby applying additional traction to the driven disc. Thus, the idler sprocket senses increases in the tension in the final drive chain due to increased load, and as the chain tension increases, the sprocket rotates and through appropriate linkage applies additional traction force between the driven disc and drive disc.

Other advantages and meritorious features of the present invention will be more fully understood from the following description of the invention, the appended claims and the drawings, a brief description of which follows.

DETAILED DESCRIPTION OF THE INVENTION

A mower drive mechanism 10 made in accordance with the teachings of the present invention is illustrated in FIGS. 1-6. The mower drive mechanism of the present invention is designed for use on small tractor-like machines such as power lawn mowers, but it will be understood by those skilled in the art that the mechanism of the present invention may be utilized in other applications.

Figure 2:
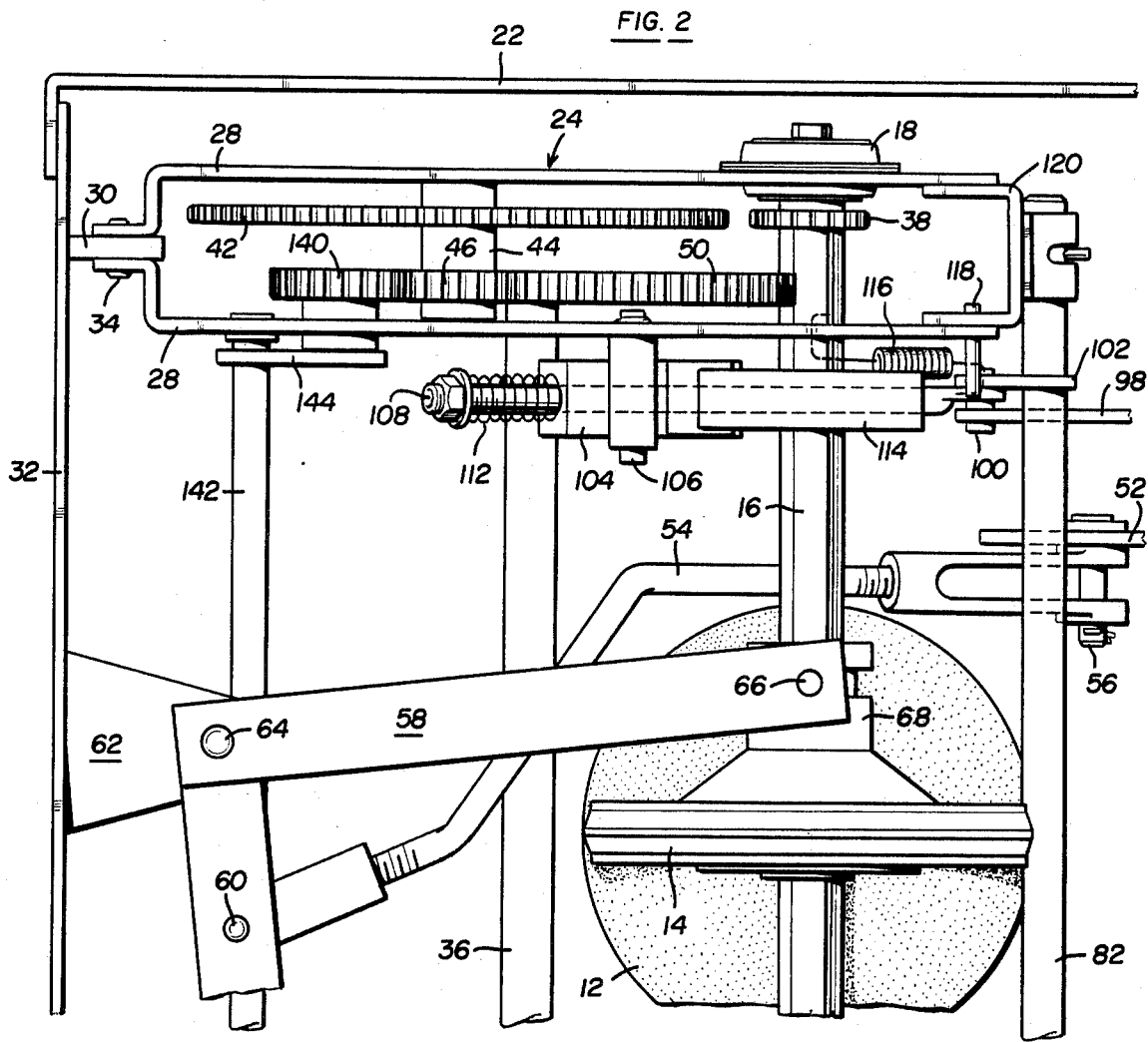
FIG. 2 is a partial top plan view of the mower drive mechanism.
Figure 5:
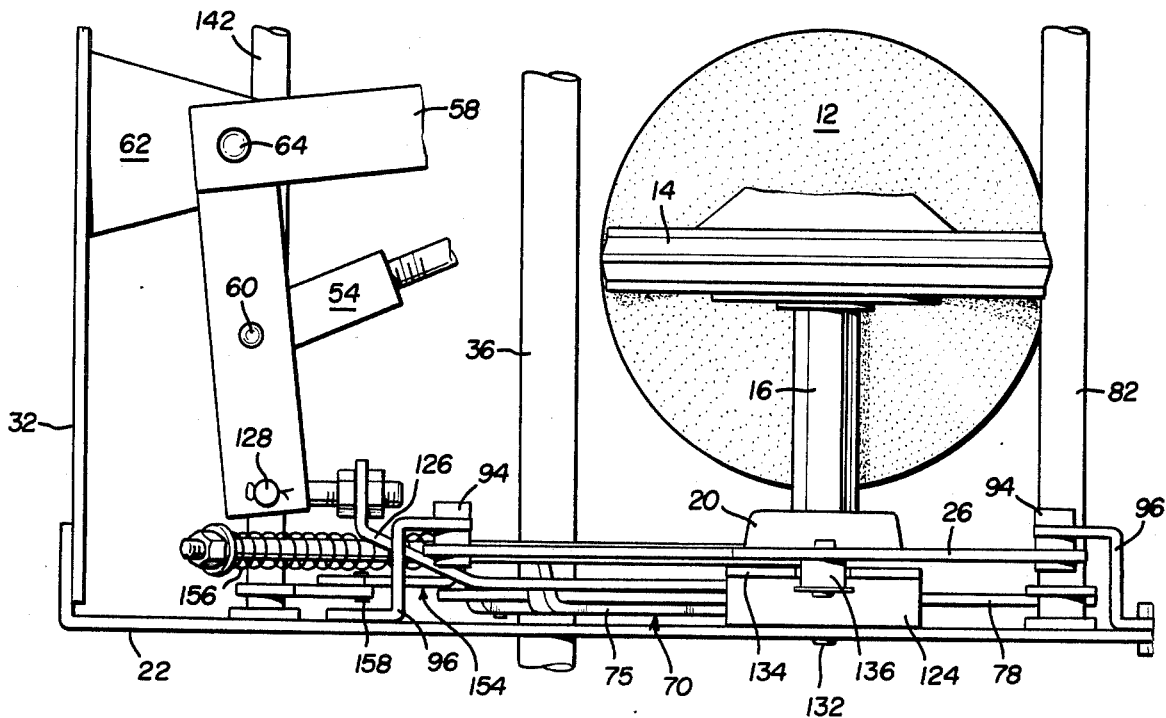
FIG. 5 is another partial top plan view of the mower drive mechanism.

As is conventional, the power source for the mower drive mechanism 10 may be a conventional gasoline motor (not shown) having a drive shaft extending vertically downward with a drive pulley secured to the shaft for rotation therewith. Such an arrangement is shown in U.S. Pat. No. 4,169,392, assigned to the assignee of the present invention, which disclosure is incorporated by reference herein. Referring to FIGS. 2 and 5, a horizontally disposed drive disc 12 is rotatably connected by conventional means to a drive pulley on a motor (not shown), as just described, with the motor rotatably driving the drive disc 12 about a vertical axis as disclosed in U.S. Pat. No. 4,169,392.

The driven assembly includes a friction or driven disc 14 (FIGS. 1, 2 and 5) which is rotatably supported on an axis comprising drive shaft 16, bearing 18 (FIG. 2) and bearing 20 (FIG. 5). The bearing ends 18 and 20 of drive shaft 16 are pivotally movable downwardly to permit engagement between friction disc 14 and drive disc 12, as will be described. Drive shaft 16 is supported for rotation within a frame comprising side plates 22 (FIGS. 1, 2, 5 and 6). The side plates 22 are fixed and supported in a conventional manner within the tractor frame (not shown).

Drive shaft 16 is supported for rotation by pivot frame 24 at bearing end 18 and by swing plate 26 at bearing end 20. The rim of friction disc 14 is received against the flat horizontal face of drive disc 12, rotating the friction disc 14 in one direction on one side of the central vertical axis through disc 12 and in the opposite direction on the opposed side of the central vertical axis through disc 12. Further, the speed of rotation imparted to driven disc 14 is dependent upon its distance from the central vertical axis through disc 12 with the speed being greatest at the periphery of the drive disc 12 and zero or "neutral" at the vertical axis through the center of drive disc 12. This form of friction transmission is described in more detail in the above-referenced U.S. Pat. No. 4,169,392.

Figure 1:
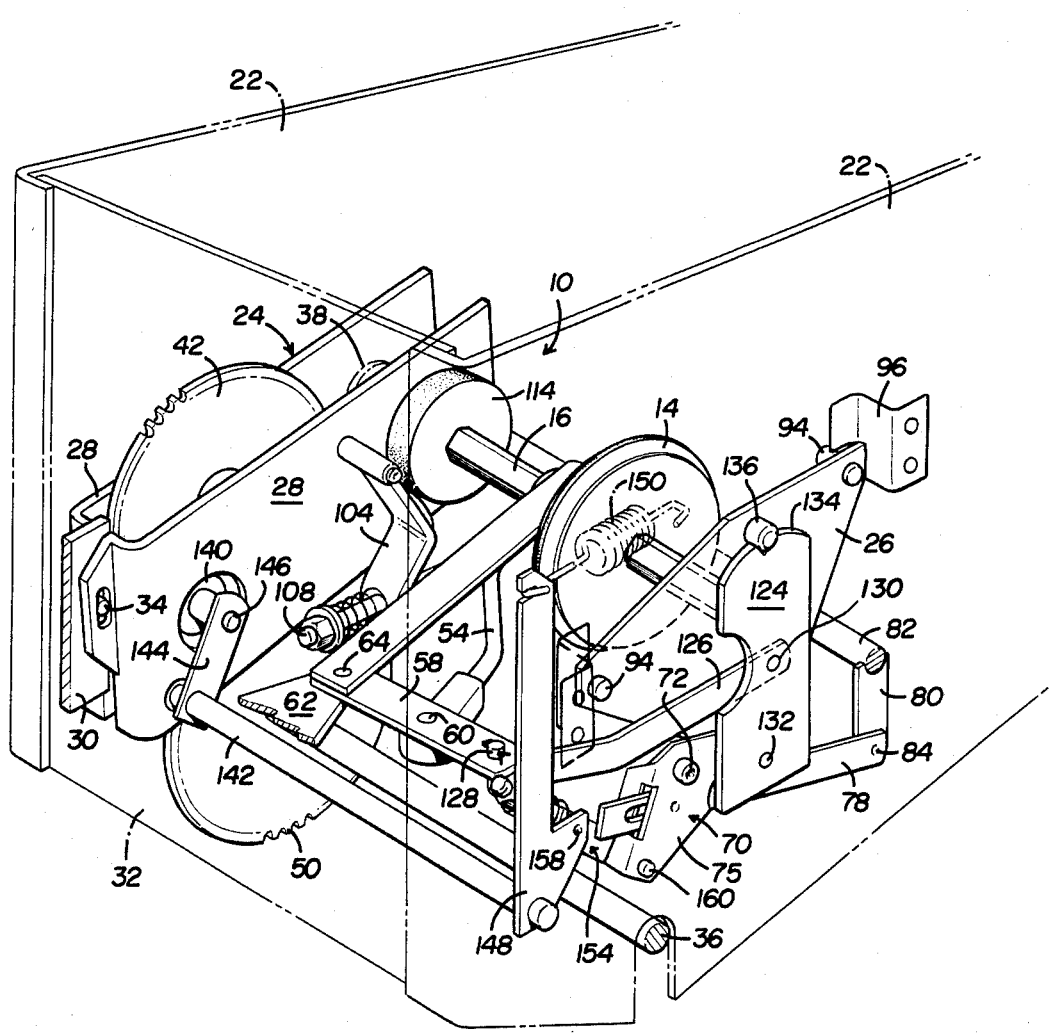
FIG. 1 is a perspective view of the mower drive mechanism of the present invention.
Figure 3:
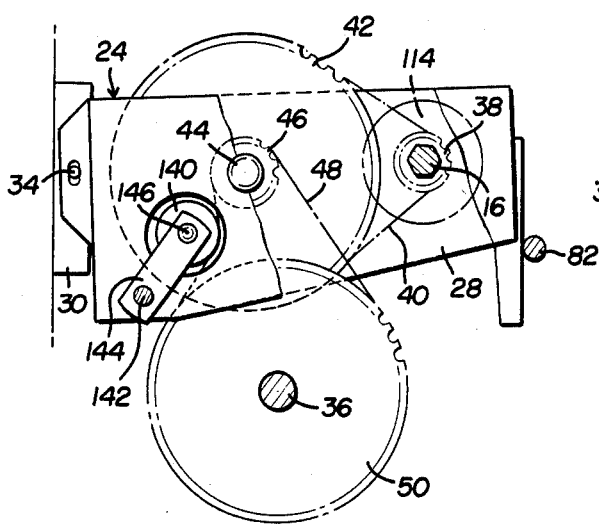
FIG. 3 is a side elevational view illustrating the idler sprocket and final drive for the mower mechanism.

Pivot frame 24 includes side plates 28 and support end bracket 30 which is welded or otherwise secured to a vertical end plate 32 connecting frame side plates 22. The side plates 28 of pivot frame 24 are pivotally supported on bracket 30 in a conventional manner as shown in FIG. 1. In the disclosed embodiment, a pin 34 is received through the ends of side plates 28 and bracket 30 thereby permitting frame 24 to pivot or move vertically along with drive shaft 16.

Power is transmitted to the rear wheel 36 and consequently to the rear wheels of the tractor (not shown) as follows. A sprocket 38 is connected to drive shaft 16 between side plates 28 for rotation with driven disc 14. A first drive chain 40 (FIG. 3) is entrained between sprocket 38 and a larger sprocket 42 for driving the larger sprocket. Sprocket 42 is rotatably supported between frame side plates 28 of pivot frame 24 a second shaft or hub 44. Sprocket 42, in turn, rotates a second smaller sprocket 46 which is also mounted on hub 44. A second drive chain 48 (FIG. 3) is then entrained between hub sprocket 46 and the rear wheel axle sprocket 50. Thus, power is transmitted through friction discs 12 and 14 and through drive chains 40 and 48 to rear axle 36 to drive the wheels (not shown) of the tractor forward or in reverse dependent upon the position of friction disc 14 relative to drive disc 12 as described above.

Referring now to FIGS. 1 and 2, the speed and direction of rotation of driven disc 14 is controlled by operating an operator's handle (not shown) which may be positioned adjacent the steering column of the tractor (not shown). A link 52 (FIG. 2) is connected to the operator's handle (not shown) for transmitting the motion of the handle to a connecting member 54 which is attached to link 52 by pin 56. Connecting member or moving means 54 is, in turn, pivotally connected to an L-shaped control member 58 by pin 60. L-shaped control member 58 is secured to bracket 62 on end wall 32 by pin 64 thereby permitting rotation of control member 58 about a vertical axis. Control member 58 is also connected by pin 66 to a slidable yoke 68 (FIG. 2) which is attached to driven disc 14. Thus, control member 58 is rotated in response to movement being imparted to link 52 and connecting member 54 for causing driven disc 14 to move linearly along drive shaft 16 to a desired speed and direction of rotation setting.

As described, the speed of rotation of driven disc 14 is reduced as disc 14 approaches the center or neutral vertical axis of drive disc 12. Conversely, as driven disc 14 is moved toward the periphery of drive disc 12, its speed of rotation increases. Further, friction disc 14 is rotated in one direction on one side of the central vertical axis through disc 12 and in the opposite direction on the opposite side of the central vertical axis through disc 12.

The mower drive mechanism 10 of the present invention provides a smooth start when discs 12 and 14 are initially engaged while being self-energizing to overcome slippage under load. Referring now to FIGS. 1-2 and 4-6, the clutch and brake assembly for the mower drive mechanism includes as one of its principal components the swing plate 26 that supports one end of drive shaft 16. Swing plate 26 is lifted and lowered by means of a bellcrank actuator assembly 70 that is pivotally attached to one of the frame side walls 22 by pivot pin 72. The swing plate 26 and bellcrank actuator assembly 70 constitute a movable means for raising and lowering driven disc 14 relative to drive disc 12.

Figure 6:
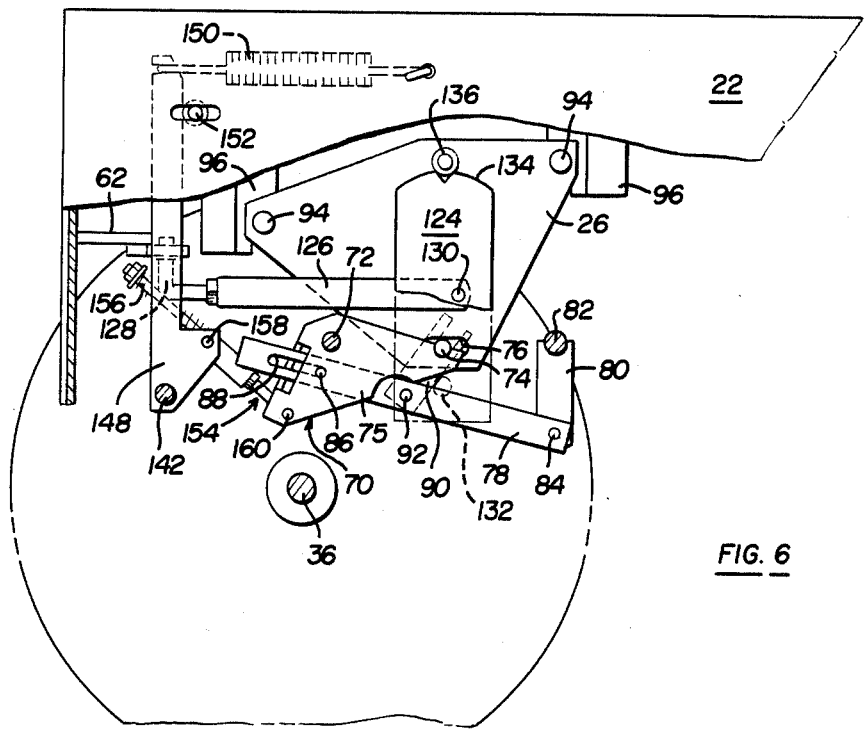
FIG. 6 is a side elevational view illustrating the clutch assembly for the mower mechanism.

Bellcrank actuator assembly 70 includes an enlarged actuator pin 74 formed on a bellcrank or actuator member 75 with the actuator pin 74 being movable within an enlarged slot 76 in swing plate 26 as illustrated in FIG. 6. Actuator assembly 70 further includes a drag link 78 which is connected by means of lever 80 to a clutch-brake rockshaft 82. Drag link 78 is pivotally connected to lever 80 by pin 84. A pin 86 (FIG. 6) in bellcrank member 75 extends into a slot 88 formed at one end of drag link 78 for permitting both generally linear and rotary movement of link 78 relative to member 75. Drag link 78 also includes a lift pawl 90 which is pivotally attached to link 78 by pin 92. Lift pawl 90 includes an open slotted end which embraces actuator pin 74 for rotating bellcrank member 75 and for lifting pin 74 within swing plate slot 76 in response to counterclockwise rotation of rockshaft 82 as viewed in FIG. 6.

Thus, when clutch-brake rockshaft 82 rotates counterclockwise as viewed in FIG. 6, drag link 78 shifts to the right and rotates upwardly about pin 86. Lift pawl 90, in turn, rotates bellcrank member 75 and actuator pin 74 upwardly within swing plate slot 76 which ultimately results in upward movement of swing plate 26 for raising driven disc 14 away from drive disc 12 thereby declutching the friction transmission formed between discs 12 and 14.

Swing plate 26 includes guide pins 94 which are engageable with guide brackets 96 to limit vertical upward movement of swing plate 26. Guide brackets 96 are attached to one of the frame side walls 22.

Figure 4:
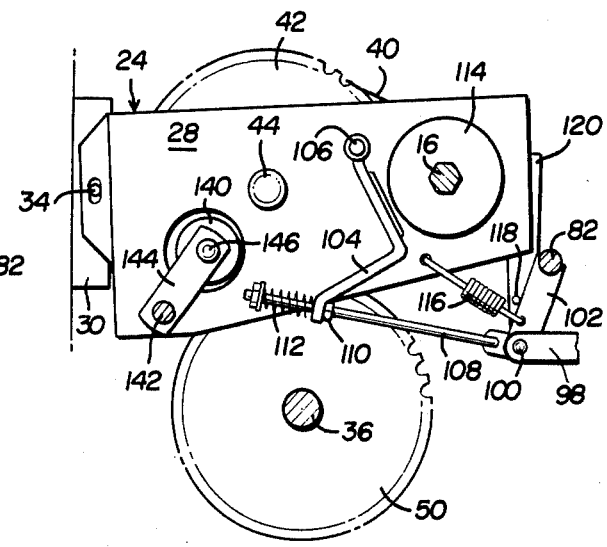
FIG. 4 is a side elevational view illustrating the braking assembly for the mower drive mechanism.

Referring now to FIGS. 2 and 4, clutch-brake rockshaft 82 is rotated in response to movement being imparted to clutch-brake link 98 (FIG. 2). Link 98 may be connected to a conventional foot pedal (not shown) which is despressed when either a clutching or braking action is desired. Clutch-brake link 98 is connected to clutch-brake rockshaft 82 by means of a pin 100 and lever 102 (FIGS. 2 and 4). Thus, when movement is imparted to link 98, rockshaft 82 is rotated for raising driven disc 14 away from drive disc 12 as previously described.

Further, a brake arm 104 is pivotally attached at one end by pin 106 to one of the frame side plates 28 as illustrated in FIG. 4. The other end of the brake arm 104 is slidably connected to a rod 108 between an adjustment nut 110 and spring 112. Rod 108 is also connected to clutch-brake link 98 by pin 100. When movement is imparted to link 98 for the purpose of braking, rod 108 rotates brake arm 104 into engagement with brake hub 114 on drive shaft 16 thereby effecting a braking action.

Referring again to FIGS. 2 and 4, clutch-brake rockshaft 82 is normally biased toward a driving mode until a declutching or braking operation is effected by actuating or moving clutch-brake link 98 as previously described. As shown in FIG. 4, spring 116 is connected between one of the frame side plates 28 and lever 102 for normally biasing lever 102 against stop 118 which is mounted to an upright frame member 120. The spring bias applied to rockshaft 82 by spring 116 and lever 102 is transmitted through lever 80, drag link 78 and bellcrank member 75 to actuator pin 74 for applying a downward normal force on swing plate 26 thereby biasing driven disc 14 toward drive disc 12 in a driving mode. Thus, this additional spring force which is transmitted through rockshaft 82 to driven disc 14 helps to overcome slippage between discs 12 and 14 under load.

As rockshaft 82 rotates in response to declutching movement by clutch-brake link 98, driven disc 14 is raised away from drive disc 12 and then, upon further movement of link 98 and rotation of rockshaft 82, brake arm 104 is brought into engagement with brake hub 114 for effecting a braking action. That is, the declutching action occurs first and then the braking action occurs upon further rotation of rockshaft 82. Further, when clutch-brake link 98 is released for allowing driven disc 14 to come into engagement with drive disc 12, the bias on rockshaft 82 from spring 116 results in a downward bias force between actuator pin 74 and swing plate 26 which helps in overcoming slippage between discs 12 and 14 under load.

The present construction also provides a neutral lift-off mode where driven disc 14 is separated from drive disc 12 by using the same linkage that controls the speed and direction of rotation for driven disc 14. As illustrated in FIGS. 1, 5 and 6, the L-shaped control member 58 is connected to a neutral cam member 124 by means of a neutral cam drag link 126. Drag link 126 is pivotally attached to control member 58 by vertical pivot pin 128 and to cam member 124 by pin 130. Cam member 124 is pivotally attached to one of the frame side plates 22 by pin 132.

As previously described, control member 58 is rotated in response to movement being imparted to link 52 and connecting member 54 for causing driven disc 14 to move linearly along drive shaft 16 to a desired speed and direction of rotation setting. As control member 58 rotates and moves friction disc 14 toward the central vertical axis of drive disc 12, it trails drag link 126 which, in turn, rotates neutral cam member 124. A cam surface 134 on cam member 124 comes into engagement with a roller 136 on swing plate 26 when cam member 124 rotates a predetermined distance thereby raising swing plate 26 vertically. This results in driven disc 14 being raised or lifted above drive disc 12.

Thus, when driven disc 14 is moved by travel control member 58 to a neutral speed or directional setting at the central vertical axis of drive disc 12, neutral cam member 124 is automatically rotated a predetermined amount by drag link 126 to cause engagement between cam surface 134 and roller 136 thereby lifting driven disc 14 away from drive disc 12. This occurs without the need for declutching through rockshaft 82 and bellcrank actuator assembly 70.

The mower drive mechanism 10 of the present invention includes another assembly for providing additional traction force when discs 12 and 14 are under load. An idler sprocket 140 (FIGS. 1-3) is rotatably mounted to a rockshaft 142 by means of a lever 144. Sprocket 140 is rotatably mounted on lever 144 by pin 146 for engagement with the drive chain 48 (FIG. 3) connecting hub sprocket 46 and the rear wheel axle sprocket 50. Rockshaft 142 is journalled at one end to one of the frame side plates 28 and at its opposite end to one of the frame side plates 22. A lever 148 is rotatably connected at one end to rockshaft 142 and its opposite end is biased by spring 150 (FIG. 6) into engagement with adjustable stop 152 with spring 150 and stop 152 being attached to one of the frame side plates 22. Thus, idler sprocket 140 is biased a predetermined distance against drive chain 48 (FIG. 3) by the coaction between spring 150, lever 148, rockshaft 142 and lever 144.

Lever 148 is also connected to bellcrank member 75 by means of a spring assembly 154 which includes a compression spring 156. Spring assembly 154 is connected between lever 148 and bellcrank member 75 by pins 158 and 160 and spring 156 is adjusted so that normally, no force is applied by spring 156 to the linkage.

In operation, the tension in final drive chain 48 increases as the load on the mower drive mechanism increases. When the final drive chain tension force exceeds the preload force on sprocket 140 from spring 150, sprocket 140 is rotated counterclockwise as viewed in FIG. 3, which, in turn, rotates lever 148 and puts spring assembly 154 in tension. This causes bellcrank member 75 to rotate resulting in a downward application of force from actuator pin 74 against swing plate 26 thereby applying additional traction to driven disc 14.

Thus, idler sprocket 140 senses increases in the tension in final drive chain 48 due to increased load. As the chain tension increases, sprocket 140 rotates and through lever 148 and spring assembly 154 applies additional traction force between driven disc 14 and drive disc 12.

As described, the mower drive mechanism 10 has several interrelated operating assemblies including a clutch-brake assembly, a travel control and neutral liftoff assembly, and traction sensor assembly:

(a) The clutch-brake assembly
When clutch-brake rockshaft 82 is rotated a predetermined amount in response to movement being imparted to clutch-brake link 98 (FIG. 2), a coaction occurs between drag link 78, bellcrank member 75, lift pawl 90, actuator pin 74 and swing plate 26 for raising driven disc 14 away from drive disc 12 thereby declutching the friction transmission formed between discs 12 and 14. Further rotation of rockshaft 82 causes brake arm 104 to come into engagement with brake hub 114 on drive shaft 16 thereby effecting a braking action. Also, the spring force applied to rockshaft 82 by spring 116 and lever 102 is transmitted through lever 80, drag link 78 and bellcrank member 75 to actuator pin 74 for applying a downward force on swing plate 26 thereby biasing driven disc 14 toward drive disc 12 in a driving mode.

(b) The travel control and neutral liftoff assembly
Control member 58 is rotated in response to movement being imparted to link 52 and connecting member 54 for causing driven disc 14 to move linearly along drive shaft 16 to a desired speed and direction of rotation setting. As friction disc 14 moves toward the central vertical axis of drive disc 12 when the transmission is to be positioned at neutral or for changing the direction of rotation, neutral cam member 124 raises swing plate 26 only when disc 14 reaches the center of disc 12 thereby raising disc 14 above drive disc 12. This occurs without the need for declutching through rockshaft 82 and bellcrank actuator assembly 70.

(c) The traction sensor assembly
Idler sprocket 140 senses increases in the tension in final drive chain 48 due to increased load and as the chain tension increases, additional traction force is applied between discs 12 and 14 by means of lever 148 and spring assembly 154.

It will be apparent to those skilled in the art that the foregoing disclosure is exemplary in nature rather than limiting, the invention being limited only by the appended claims.

I claim:
1. A mower drive mechanism comprising:
a drive disc rotatably mounted on a generally vertical axis, a driven disc rotatably mounted on a drive shaft above said drive disc, and said driven disc having a periphery that is selectively movable into contact with a face on said drive disc;
movable means for raising and lowering said driven disc relative to said drive disc, said movable means including a swing plate connected to said driven disc drive shaft and a bellcrank actuator assembly connected to said swing plate for raising and lowering said swing plate;
said bellcrank actuator assembly including an actuator member having a pin means that is movable within a slot in said swing plate, said actuator assembly further including a drag link connected to a rotatable clutch-brake rockshaft and to said actuator member, said drag link having a lift pawl pivotally attached thereto with said lift pawl engaging said actuator pin means, and rotation of said clutch-brake rockshaft in a first direction resulting in movement being imparted to said drag link, lift pawl and actuator pin means for raising said swing plate and therefore said driven disc away from said drive disc.

2. The mower drive mechanism as defined in claim 1 wherein said clutch-brake rockshaft being biased by spring means to rotate in a direction opposite to said first direction, the spring bias applied to said rockshaft being transmitted through said drag link and bellcrank member to said actuator pin means for applying a downward normal force on said swing plate thereby biasing said driven disc toward said drive disc in a driving mode of operation.

3. The mower drive mechanism as defined in claim 1 wherein said clutch-brake rockshaft being rotated in response to movement imparted to a clutch-brake link, a brake arm operably connected to said clutch-brake link and said brake arm being movable into engagement with a brake hub on said drive shaft thereby effecting a braking action in response to a predetermined amount of movement of said clutch-brake link.

4. The mower drive mechanism as defined in claim 1 wherein said driven disc being slidably movable along said drive shaft, a control member connected to said driven disc and to a neutral cam member, and means for moving said control member thereby causing said driven disc to move along said drive shaft to a desired speed and direction of rotation setting;

said neutral cam member engaging said swing plate in response to a predetermined movement imparted to said control member for raising said swing plate and therefore said driven disc away from said drive disc.

5. The mower drive mechanism as defined in claim 1 including a second shaft rotatably connected to said drive shaft, said second shaft having a sprocket mounted thereon, a wheel axle mounted below said second shaft, said wheel axle having a wheel axle sprocket mounted thereon, and a drive chain entrained between said sprockets;

an idler sprocket rotatably mounted to a second rockshaft for engagement with said drive chain, a lever connected to said second rockshaft and said lever being spring biased for biasing said idler sprocket into engagement with said drive chain, said lever connected to said bellcrank actuator member by means of a spring assembly, and said idler sprocket being rotated in response to increases in the tension in said drive chain thereby rotating said bellcrank actuator member for applying additional traction force to said driven disc.

* * * * *